(12) United States Patent
Ho et al.

(10) Patent No.: US 7,632,544 B2
(45) Date of Patent: Dec. 15, 2009

(54) NANOPATTERNED TEMPLATES FROM ORIENTED DEGRADABLE DIBLOCK COPOLYMER THIN FILMS

(75) Inventors: Rong-Ming Ho, Hsinchu (TW);
Hui-Wen Fan, Hsinchu (TW);
Wen-Hsien Tseng, Hsinchu (TW);
Yeo-Wan Chiang, Hsinchu (TW);
Chu-Chien Lin, Taichung (TW);
Bao-Tsan Ko, Hsinchu (TW);
Bor-Hunn Huang, Taichung (TW);
Hsi-Hsin Shih, Hsinchu (TW);
Joung-Yei Chen, Hsinchu (TW)

(73) Assignee: Industrial Technology Research Institute (TW)

( * ) Notice: Subject to any disclaimer, the term of this patent is extended or adjusted under 35 U.S.C. 154(b) by 1025 days.

(21) Appl. No.: 10/850,169

(22) Filed: May 18, 2004

(65) Prior Publication Data

US 2004/0265548 A1 Dec. 30, 2004

(51) Int. Cl.
*B05D 3/00* (2006.01)
*B05D 5/00* (2006.01)
(52) U.S. Cl. ............................ 427/271; 427/256
(58) Field of Classification Search ................ 427/256, 427/271, 240, 259, 472
See application file for complete search history.

(56) References Cited

U.S. PATENT DOCUMENTS 6,054,111 A * 4/2000 Antonietti et al. .......... 423/702
6,271,308 B1 * 8/2001 de Boer et al. ............... 525/88

OTHER PUBLICATIONS

Zalusky et al. "Mesoporous Polystyrene Monoliths", Journal American Chemical Society. 2001, 123, 1519-1520.*

* cited by examiner

*Primary Examiner*—Roberts Culbert
(74) *Attorney, Agent, or Firm*—Lowe Hauptman Ham & Berner, LLP

(57) ABSTRACT

A nanopatterned template for use in manufacturing nanoscale objects. The nanopatterned template contains a nanoporous thin film with a periodically ordered porous geomorphology which is made from a process comprising the steps of: (a) using a block copolymerization process to prepare a block copolymer comprising first and second polymer blocks, the first and second polymer blocks being incompatible with each other; (b) forming a thin film under conditions such that the first polymer blocks form into a periodically ordered topology; and (c) selectively degrading the first polymer blocks to cause the thin film to become a nanoporous material with a periodically ordered porous geomorphology. In a preferred embodiment, the block copolymer is poly(styrene)-poly(L-lactide) (PS-PLLA) chiral block copolymer, the first polymer is poly(L-lactide), and the second polymer is polystyrene. Experimental results show that the first polymer blocks can be formed into a hexagonal cylindrical geomorphology with its axis perpendicular to a surface of the thin film. After hydrolysis to selectively degrade the first polymer blocks, a thin film having a series of repeated nanoscale hexagonal-cylindrical channels is obtained.

9 Claims, 6 Drawing Sheets a)  b)

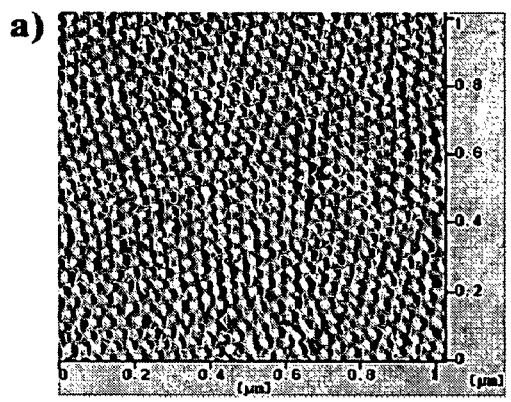
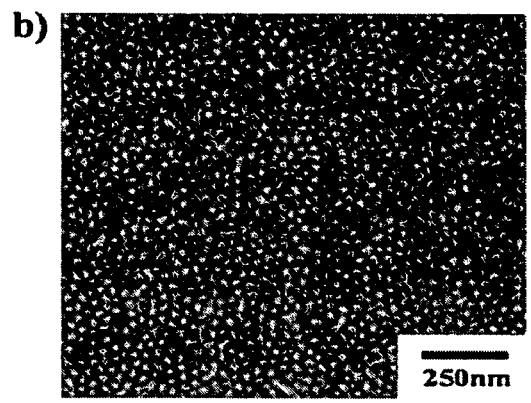
Fig. 2A
Fig. 2B
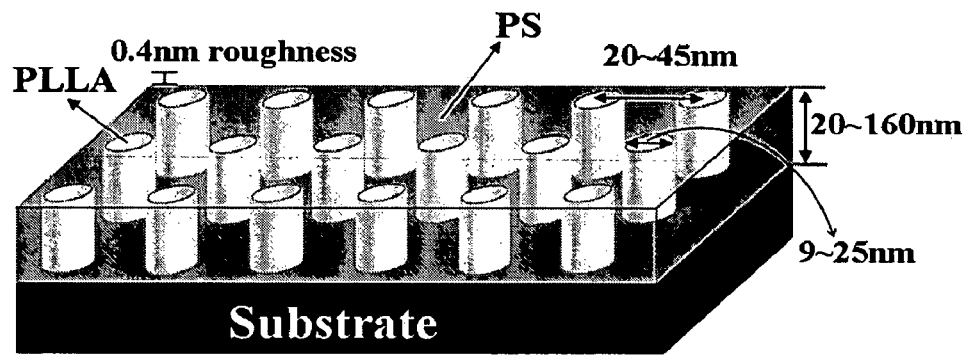
Fig. 3A
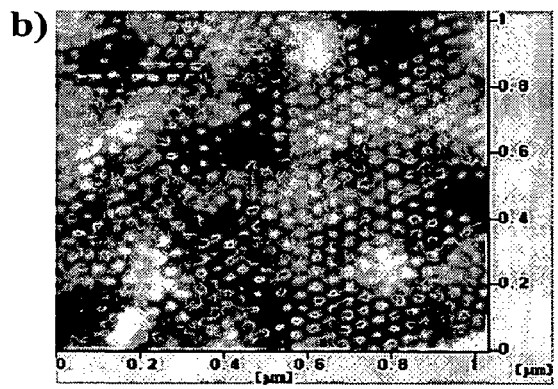
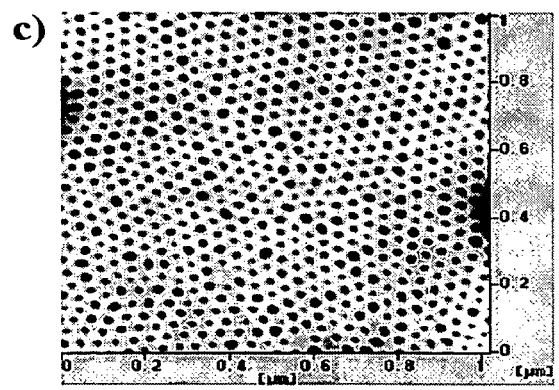
Fig. 3B
Fig. 3C

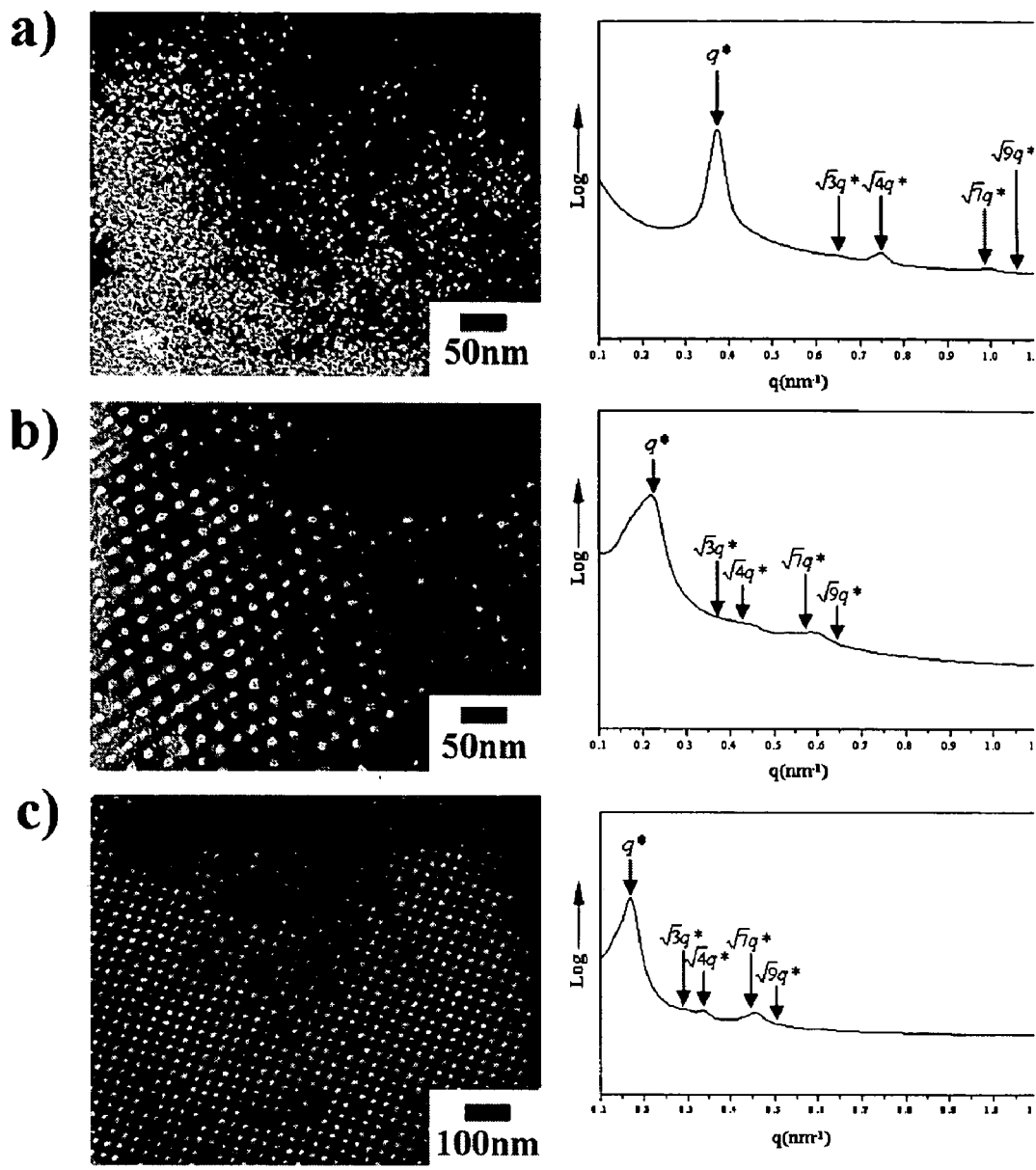
| Fig. 4A | Fig. 4D |
| Fig. 4B | Fig. 4E |
| Fig. 4C | Fig. 4F |

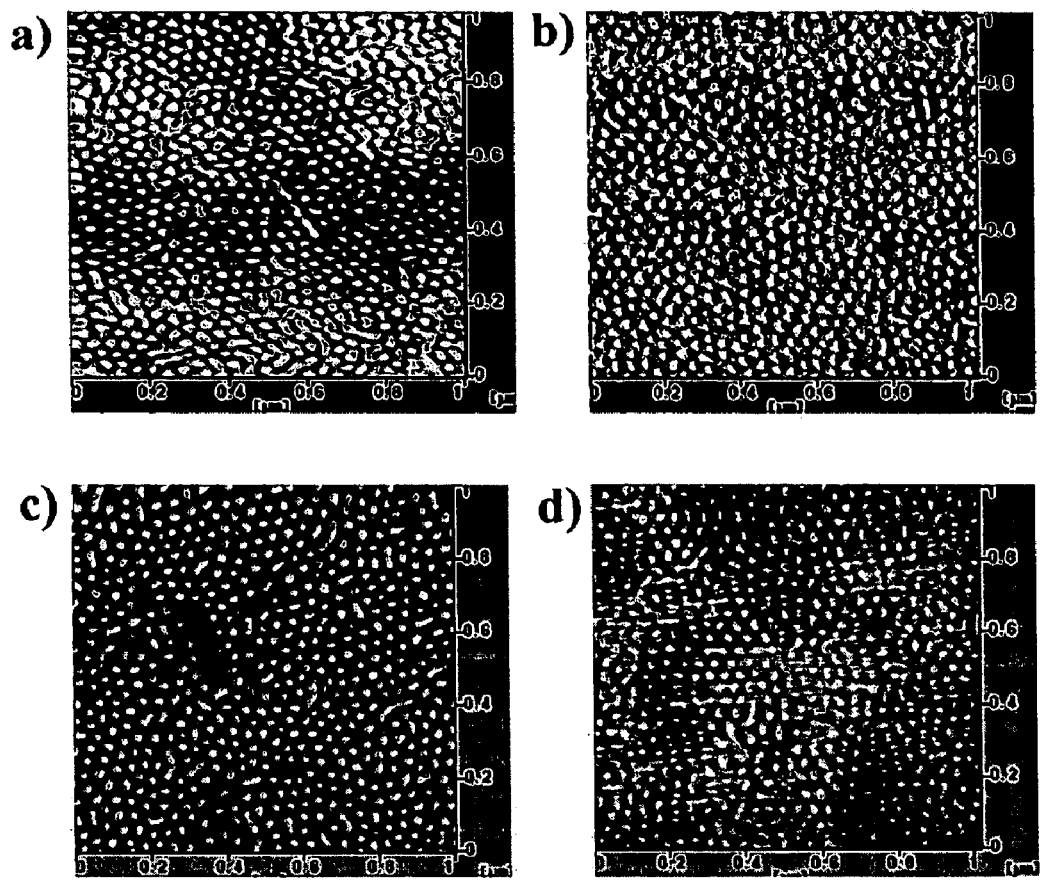
| Fig. 5A | Fig. 5B |
| Fig. 5C | Fig. 5D |
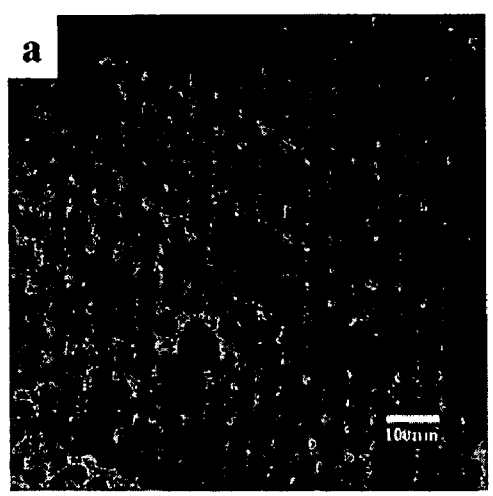
Fig. 10A
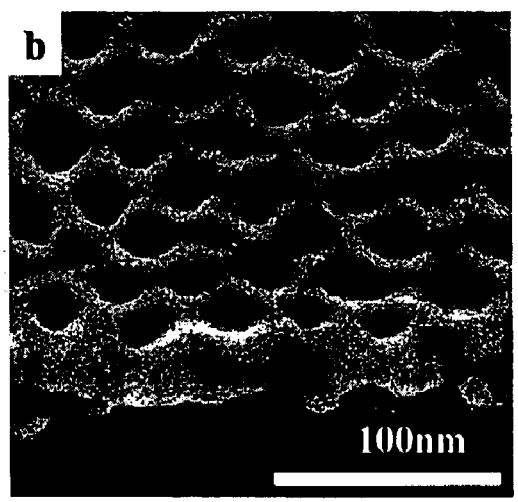
Fig. 10B

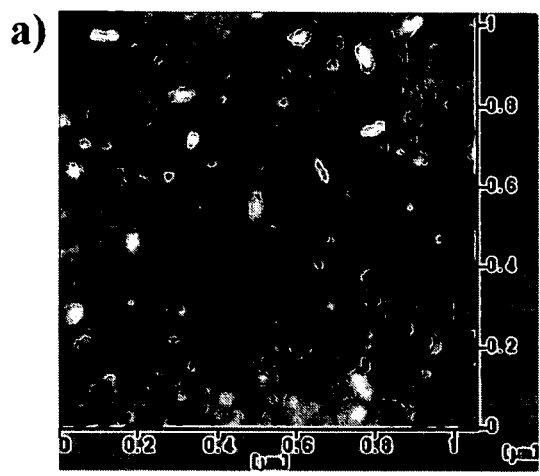
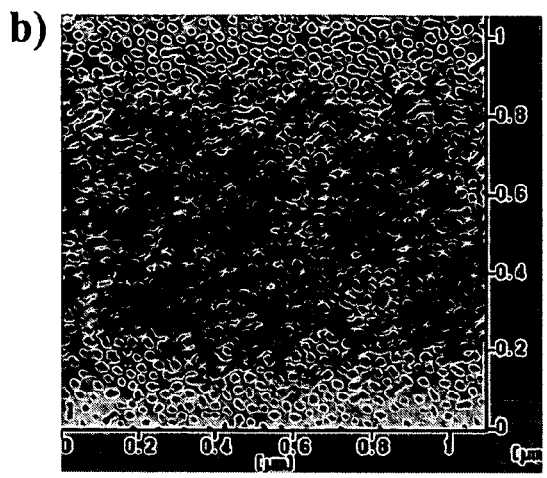
Fig. 6A
Fig. 6B
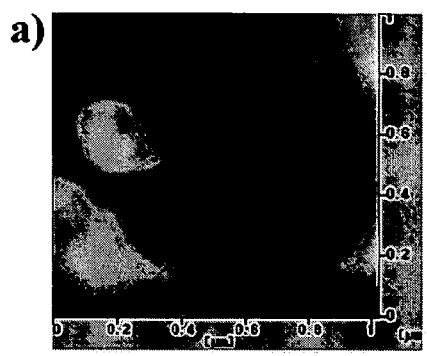
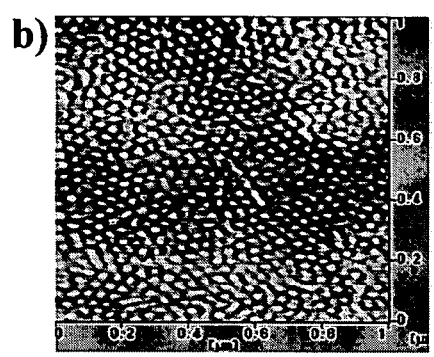
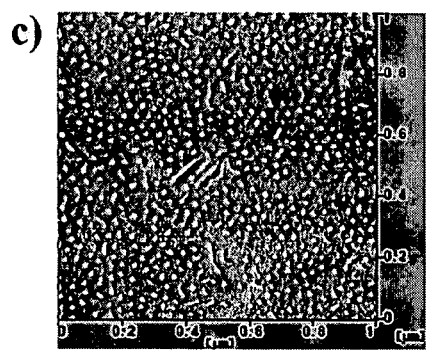
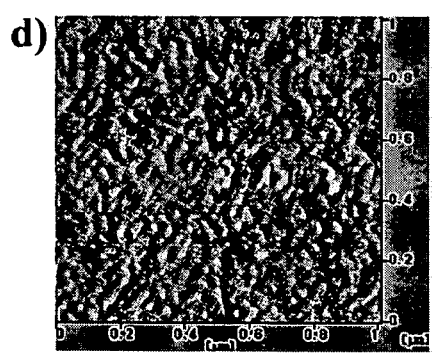
| Fig. 7A | Fig. 7B |
|---------|---------|
| Fig. 7C | Fig. 7D |

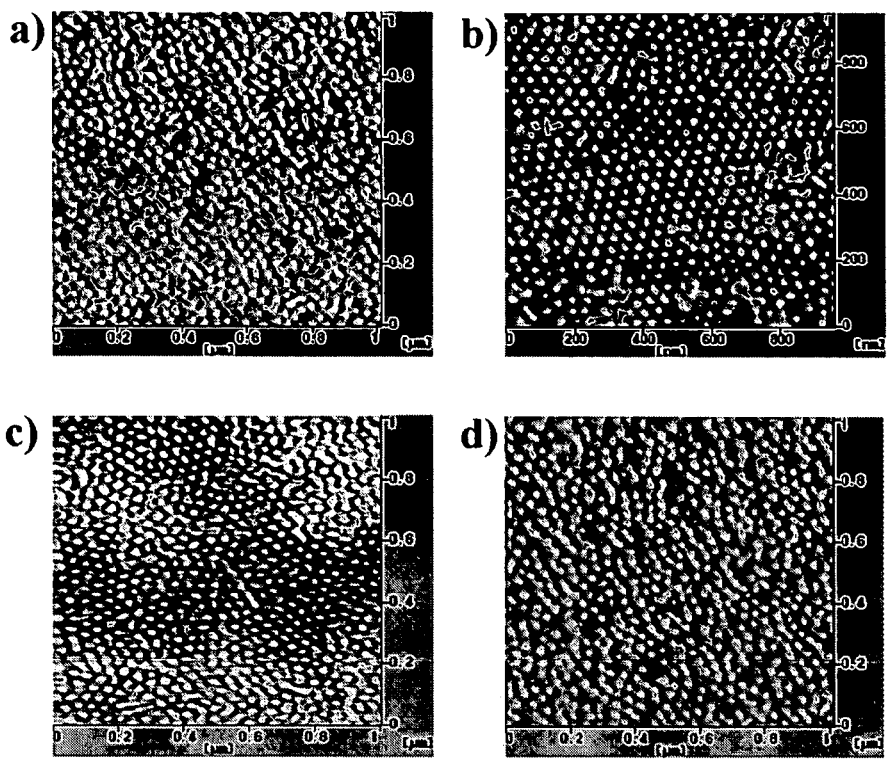
| Fig. 8A | Fig. 8B |
| Fig. 8C | Fig. 8D |
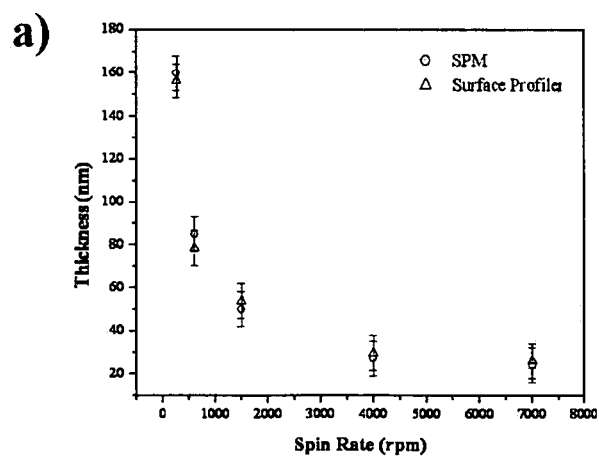
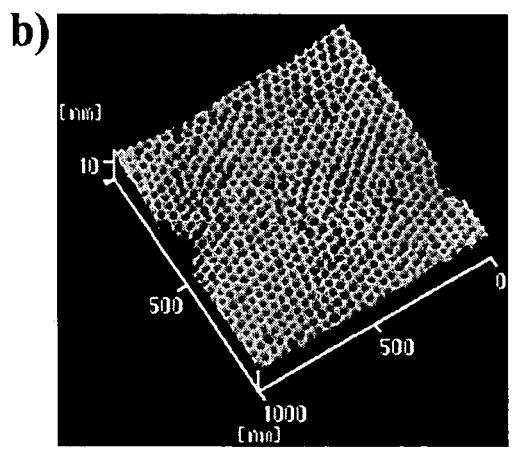
Fig. 9A
Fig. 9B

NANOPATTERNED TEMPLATES FROM ORIENTED DEGRADABLE DIBLOCK COPOLYMER THIN FILMS

FIELD OF THE INVENTION

The present invention relates to a novel method for making nanopatterned templates which can be subsequently used for preparing nanoscale industrial objects. More specifically, the present invention relates to a novel method which utilizes oriented degradable diblock copolymer thin films to form nanopatterned templates. The nanopatterned templates so formed from the method of the present invention can also be referred to as "nanoreactors", which are articles containing a series of periodic nanostructured porous channels that can be used as molds, masks, or other types of templates, to subsequently manufacture products in nanoscale dimensions. The nanopatterned templates of the present invention can be advantageously and cost-effectively manufactured which can be subsequently utilized in healthcare, semiconductor, as well as many other industrial applications.

BACKGROUND OF THE INVENTION

In recent years, the science involving the manufacturing and applications of nano-dimensioned ("nanomaterials") has become one of the most promising and creative research areas. One convenient way to prepare materials in nanoscale dimension is to provide nanopatterned templates, i.e., "nanopatterns" with periodic porous nanostructured articles, for the growth of nanomaterials. These nanopatterned templates can be considered as "nanoreactor" for producing nanomaterials. More recently, extensive studies to exploit the concept of nanoreactors have been carried out in different research areas, and wide varieties of nanomaterials and nanoarrays have thus been obtained. Different methods for nanopatterning such as photolithography, soft lithography, scanning probe lithography, electronlithography (i.e., top-down methods) and self-assembly of living cells, surfactants, dendrimers and block copolymers (i.e., bottom-up methods) have been proposed and examined. For a recent review, see C. Park, J. Yoon, E. L. Thomas, *Polymer* 2003, 44, 6725-6760.

Among these studies, the formation of nanopatterns from the self-assembly of block copolymers driven by the immiscibility between the constituted blocks can be efficiently, economically achieved due to the ease of processing. Examples of this study can be found in Bates, F. S.; Fredrickson, G. H. *Annu. Rev. Phys. Chem.* 1990, 41, 525-557. For such nanopatterns to prove useful in nanoapplications, it is necessary to generate thin-film samples with well-oriented periodic arrays over large area. Different approaches to control over the orientation of phase-separated microdomains (MD) have been achieved by using (1) solution casting, see, e.g., G. Kim, M. Libera, *Macromolecules* 1998, 31, 2569-2577; P. Mansky, C. K. Harrison, P. M. Chaikin, R. A. Register, N. Yao, *Appl. Phys. Lett.* 1996, 68, 2586-2588; and R. G. H. Lammertink, M. A. Hempenius, J. E. van der Enk, V. Z.-H. Chan, E. L. Thomas, G. J. Vansco, *Adv. Mater.* 2000, 12, 98-103; (2) shear fields, see, e.g., G. Kim, M. Libera, *Macromolecules* 1998, 31, 2569-2577; P. Mansky, C. K. Harrison, P. M. Chaikin, R. A. Register, N. Yao, *Appl. Phys. Lett.* 1996, 68, 2586-2588; and R. G. H. Lammertink, M. A. Hempenius, J. E. van der Enk, V. Z.-H. Chan, E. L. Thomas, G. J. Vansco, *Adv. Mater.* 2000, 12, 98-103; (3) electric fields, see, e.g., T. L. Morkved, M. Lu, A. M. Urbas, E. E. Ehrichs, H. M. Jaeger, P. Mansky, T. P. Russell, *Science* 1996, 273, 931-933; and T. Thurn-Albrecht, J. Schotter, G. A. Kästle, N. Emley, T. Shibauchi, L. Krusin-Elbaum, K. Guarini, C. T. Black, M. T. Tuominen, T. P. Russell, *Science* 2000, 290, 2126-2129; (4) patterned substrates, see, e.g., P. Mansky, Y. Liu, E. Huang, T. P. Russell, C. J. Hawker, *Science* 1997, 275, 1458-1460; E. Huang, L. Rockford, T. P. Russell, C. J. Hawker, *Nature* 1998, 395, 757-758; L. Rockford, Y. Liu, P. Mansky, T. P. Russell, *Phys. Rev. Lett.* 1999, 82, 2602-2605; and J. Heier, J. Genzer, E. J. Kramer, F. S. Bates, G. Krausch, *J. Chem. Phys.* 1999, 111, 11101-11110; (5) temperature gradients, see, e.g., T. Hashimoto, J. Bodycomb, Y. Funaki, K. Kimishima, *Macromolecules* 1999, 32, 952-954; and (6) epitaxial crystallization, see, e.g., J. C. Wittmann, B. Lotz, *Prog. Polym. Sci.* 1990, 15, 909-948; C. De Rosa, C. Park, E. L. Thomas, B. Lotz, *Nature* 2000, 405, 433-437; and R.-M. Ho, P.-Y. Hsieh, W.-H. Tseng, C.-C. Lin, B.-H. Huang, B. Lotz *Macromolecules* 2003, 36, 9085-9092.

Recently, a very rapid route to generate oriented Microdomains for use as a water-permeable membrane by spin coating for poly(styrene)-b-poly(ethyleneoxide) (PS-PEO) has been reported; within seconds, arrays of nanoscopic cylindrical domains of PEO were produced in a glassy PS matrix to open a novel route towards water permeable membranes with well-defined channel size. Their results are reported in Z. Q. Lin, D. H. Kim, X. D. Wu, L. Boosahda, D. Stone, L. LaRose, T. P. Russell, *Adv. Mater.* 2002, 14, 1373-1376. It has also been reported that block copolymers containing polyesters become the novel families for the preparation of nanoporous materials where polyester blocks might be selectively degraded, particularly by hydrolysis treatment, see, e.g., H. Tsuji, Y. Ikada, *J. Polym. Sci., Part A: Polym. Chem.*, 1998, 36, 59-66; and A. S. Zalusky, R. Olayo-Valles, C. J. Taylor, M. A. Hillmyer, *J. Am. Chem. Soc.* 2001, 123, 1519-1520. In the later article, it was also reported that ordered nanoporous polymers from poly(styrene)-b-poly(D,L-lactide) (PS-PLA) block copolymers has been successfully achieved by simply chemical etching of the PLA in the bulk.

SUMMARY OF THE INVENTION

The primary object of the present invention is to develop an improved method for making industrial objects with nanoscale dimensions, or nanomaterials. More specifically, the primary object of the present invention is to develop an improved method for preparing nanopatterned templates, which can be subsequently utilized for making nanomaterials.

In the present invention, it was discovered that large-scale, well-oriented nanochannel arrays in the form of thin films can be efficiently and cost-effectively produced by using degradable block copolymers. In some of the preferred embodiments the details of which will be discussed below, a series of degradable block copolymers, poly(styrene)-b-poly (L-lactide) (PS-PLLA), with PLLA hexagonal cylinder (HC) morphology has been synthesized. By selecting appropriate solvent for spin coating, the formation of large-size, oriented microdomains of PS-PLLA thin films where the axis of hexagonal cylinder morphology is perpendicular to the substrate (i.e., perpendicular morphology) was successfully achieved. Subsequently, nanopatterned templates were prepared after hydrolysis treatment.

Bulk samples of block copolymers were prepared by solution casting from dichloromethane ($CH_2Cl_2$) solution (10 wt % of PS-PLLA) at room temperature. Hexagonal cylinder nanostructures of amorphous PS-PLLA were identified by Transmission electron microscopy (TEM) and small-angle X-ray scattering (SAXS). Similar results for various PS-PLLA samples having different molecular weights were also obtained. Thin films of the block copolymer were formed on different substrates by simply spin coating from dilute chlorobenzene ($C_6H_5Cl$) solution (1.5 wt % of PS-PLLA) at room temperature without further treatment. Well-oriented, perpendicular Microdomains was obtained as evidenced by scanning probe microscopy (SPM). The effect of alignment was further confirmed by the TEM images where the projected images reflected perpendicular cylinders on the substrate. As evidenced by selected area electron diffraction experiments, no crystalline diffraction was identified; suggesting that amorphous or low crystallinity samples were obtained after spin coating. With the process of the present invention, the oriented microdomains can be as large as several $cm^2$ in area.

The method of the present invention can be tailored for great varieties of end use applications. For example, different substrates including glass slide, carbon-coated glass slide, indium tin oxide (ITO) glass, silicon wafer, silicon oxide, inorganic light emitted diode and alumina have been used for nanopatterning. Large-size, oriented perpendicular Hexagonal cylinder morphology was obtained. However, the bottom morphology of the nanopatterns appeared well-defined nanostructures under SPM examination only if the film was treated by hydrolysis (i.e., degradation of PLLA); suggesting that there is always a thin layer of PLLA formed on the substrate after spin coating (for instance, ca. 5 nm as estimated by volume fraction for cast film on glass slide having 50 nm thickness). Similar to the recent studies of electric field alignment of block copolymers; the surface effect from coated substrate on morphology is always existent. The effects of substrate affinity and interfacial energy have been examined in this study. The surface tension of PLLA (~38.27 mN/m) is lower than that of PS (~40 mN/m) besides the affinity of PLLA with hydrophilic substrate is slightly higher than that of PS. As a result, PLLA favors to preferentially segregate on the substrate so as to form PLLA thin layer. The formation of PLLA thin layer can be avoided by spin-coating the samples at temperature above $T_{g,PLLA}$ but below $T_{g,PS}$. The behavior has also been observed in different cases; the glass transition temperature of at least one of the blocks should be below processing temperature in order to ease the substrate influence. As a result, the nanopatterned textures were thus schematically illustrated in FIG. 3A. Furthermore, the oriented nanostructures started losing orientation after long-time annealing at temperature above PLLA crystalline melting. As a result, we speculate that the ignorance of substrate effect is due to the kinetic effect under spinning to create a meta-stable morphology. Nevertheless, the oriented nanostructures can be fixed by simply oxidizing the PS matrix using $RuO_4$. After oxidation, the PS nanopatterns can be used at service temperatures above 250° C. Our preliminary results indicate that the oriented effect for block copolymer nanostructures is primarily attributed to the selection of appropriate solvent evaporation rate and its solubility between constituted blocks. Similar to solution casting approach, oriented perpendicular Hexagonal cylinder morphology was formed at intermediate evaporation rate for selective solvent. The studies of detailed mechanisms for the induced orientation are still in progress.

The method of the present invention can be utilized to extend the applicability of nanopatterns. It is possible to have tunable film thickness and dimension for nanopatterning. Reasonably wide range of film thickness from 20 nm to 160 nm can be obtained by simply controlling the spin rate of coating as expected. Oriented PS-PLLA samples can be achieved regardless of thin-film thickness. Also, the surface topography of formed nanopatterns is very smooth; the averaged roughness is in the range of 0.4 nm by SPM roughness evaluation. Different domain sizes as determined by TEM, SAXS and SPM were obtained by controlling molecular weight of PS-PLLA. Following the successful procedure for hydrolysis of PLA, well-oriented, perpendicular hexagonal cylinder nanochannel arrays were simply obtained within hour by using a sodium hydroxide solution of methanol/water (0.5M solution was prepared by dissolving 2 g of sodium hydroxide in an 40/60 (by volume) solution of methanol/water) at 60° C. for the degradation of amorphous PLLA. Consequently, nanopatterned templates over large area in addition to uniform surface with controlled thickness and domain size in the form of thin films were successfully prepared on different substrates.

In summary, in the present invention, we have presented an excellent and quick way to prepare large-scale microdomains for PS-PLLA diblock copolymers. Owing to the hydrolysis character of the polyester components, the formation of the ordered nanohole arrays provides a simple path to prepare nanopatterned templates for nanoapplications.

BRIEF DESCRIPTION OF THE DRAWING

The present invention will be described in detail with reference to the drawing showing the preferred embodiment of the present invention, wherein:

FIG. 2A shows the tapping-mode SPM phase image of the surface of spin coated PS365-PLLA109 ($f_{PLLA}^v=0.26$) thin film on carbon-coated glass slide. As observed, the phase image exhibits approximately the cross-section view of hexagonally packed cylindrical texture of which dark PS matrix indicates less phase delay than bright PLLA dispersed domains.

FIG. 2B is a direct viewing TEM image of the spin-coated thin film after staining with $RuO_4$.

FIG. 3A is a 3-D schematic illustration of PS-PLLA nanopattern prepared by spin coating.

FIGS. 3B and 3C are: (b) before hydrolysis and (c) after hydrolysis, respectively of the tapping-mode SPM height images of the surfaces of spin coated PS365-PLLA109 ($f_{PLLA}^v=0.24$) thin films on glass slides.

FIGS. 4A, 4B, and 4C are the TEM micrographs of solution-cast of (a) PS83-PLLA41 ($f_{PLLA}^v=0.34$); (b) PS198-PLLA71 ($f_{PLLA}^v=0.27$) and (c) PS280-PLLA97 ($f_{PLLA}^v=0.31$) bulk samples quenched from microphase-separated melt, respectively. The samples were microsectioned by microtome, and then stained by $RuO_4$ to obtain mass-thickness contrast. The corresponding azimuthally scanned one-dimensional SAXS profiles are also obtained as shown in FIGS. 4D, 4E, and 4F, respectively.

FIGS. 5A, 5B, 5C, and 5D are the tapping-mode SPM phase images of the surfaces of spin-coated PS365-PLLA109 ($f_{PLLA}^v=0.24$) thin films on (a) glass slide; (b) carbon-coated glass slide; (c) indium tin oxide (ITO) glass; (d) silicon wafer.

FIGS. 6A and 6B are the tapping-mode SPM height images of the bottom morphology for spin-coated PS365-PLLA109 ($f_{PLLA}^v=0.24$) thin film on glass slide (a) before hydrolysis; and (b) after hydrolysis, respectively.

FIGS. 7A, 7B, 7C, and 7D are the tapping-mode SPM phase images of the surfaces of spin coated PS365-PLLA109 ($f_{PLLA}^v$=0.24) thin films on glass slide by using different solvents for spin coating: (a) dichlorobenzene (vapor pressure at 20° C.: 0.52 mm Hg); (b) chlorobenzene (vapor pressure at 20° C.: 12 mm Hg); (c) toluene (vapor pressure at 20° C.: 22 mm Hg); (d) THF (vapor pressure at 20° C.: 131.5 mm Hg), respectively.

FIGS. 8A, 8B, 8C and 8D are the tapping-mode SPM phase images of the surfaces of spin coated PS365-PLLA109 ($f_{PLLA}^v$=0.24) thin films on glass slide from chlorobenzene with different thin-film thickness: (a) 160 nm; (b) 80 nm; (c) 50 nm; (d) 30 nm, respectively.

FIG. 9A is a plot of film thickness versus spin rate for spin-coated PS365-PLLA109 ($f_{PLLA}^v$=0.26) thin films on glass slides. Open circle indicates the sample thickness measured by SPM whereas open triangle indicates the thickness measured by depth profiler.

FIG. 9B is the 3D tapping-mode SPM height image of SPM for spin-coated PS365-PLLA109 ($f_{PLLA}^v$=0.26) thin film after hydrolysis.

FIGS. 10A and 10B show FESEM micrographs of hydrolyzed PS365-PLLA109 ($f_{PLLA}^v$=0.26) samples by viewing parallel to the cylindrical axes.

DETAILED DESCRIPTION OF THE PREFERRED EMBODIMENT

Figure 1A:
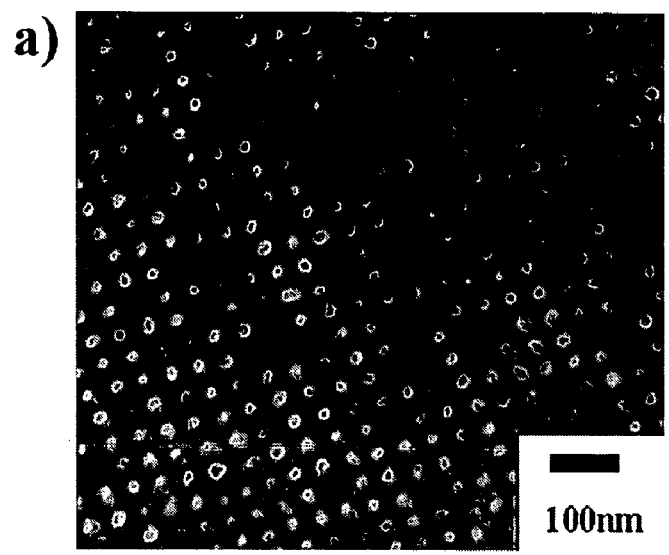
FIG. 1A is a TEM micrograph of solution-cast PS365-PLLA109 ($f_{PLLA}^v=0.26$) bulk sample quenched from microphase-separated melt; the samples were micro-sectioned by microtome and the microdomains of PS component appear relatively dark after staining by $RuO_4$, while the microdomains of PLLA component appear light FIG. 1B show the corresponding azimuthally integrated one-dimensional SAXS profile; the result suggests a HC nanostructures where scattering peaks occurred at q*ratio of 1:v3:v4:v7:v9.

The present invention will now be described more specifically with reference to the following examples. It is to be noted that the following descriptions of examples, including the preferred embodiment of this invention, are presented herein for purposes of illustration and description, and are not intended to be exhaustive or to limit the invention to the precise form disclosed.

EXAMPLE 1

Synthesis of 4-Hydroxy-TEMPO-Terminated Polystyrene (PS-2)

A mixture of styrene (46 mL, 400 mmol), BPO (0.39 g, 1.6 mmol) and 4-OH-TEMPO (0.33 g, 1.92 mmol) (molar ratio of 4-OH-TEMPO/BPO =1.2) was preheated in a round-bottom flask (250 mL) in nitrogen atmosphere at 95° C. for 3 h to allow BPO to decompose completely. The system was then heated at 130° C. for another 4 h to yield PS-TEMPO-4-OH. The resulting polystyrene was precipitated with methanol (300 mL) from a THF (50 mL) solution.

The product was then recrystallized twice from $CH_2Cl_2$ (40 mL)/MeOH (200 mL) mixed solution, and collected by vacuum filtration to give white solids. The final solid was washed by 100 mL MeOH and dried in vacuo overnight to form PS-2 [yield: 32.6 g (78%). Mn=20900 and PDI=1.17. $^1$H NMR ($CDCl_3$): 6.46-7.09 (br, 5H, ArH), 1.84 (br, 1H, CH), 1.42 (br, 2H, $CH_2$)]. All manipulations were carried out under a dry nitrogen atmosphere. Solvents, benzoyl peroxide, styrene, L-lactide, and deuterated solvents were purified before uses.

EXAMPLE 2

Synthesis of Block Copolymers of Polystyrene-Poly(L-Lactide) (PS-b-PLA, or CP-4)

A typical ring-opening polymerization procedure was exemplified by the synthesis of CP-4. [($\eta_3$-EDBP)$Li_2$]$_2$[($\eta_3$-"Bu)Li($0.5Et_2O$)]$_2$ (0.11 g, 0.1 mmol) was added to 4-hydroxy-TEMPO-polystyrene (PS-2, 4.18 g, 0.2 mmol) in 20 mL of toluene at 0° C. The mixture was stirred at room temperature for 2 h, and then dried under vacuum. The resulting product (lithium alkoxide macroinitiator) was dissolved in $CH_2Cl_2$ (20 mL) and L-lactide (2.16 g, 15 mmol) in $CH_2Cl_2$ (10 mL) was added. While the mixture was stirred for 4 h, conversion yield (74%) of poly(L-lactide) was analyzed by $^1$H NMR spectroscopic studies.

The mixture was then quenched by the addition of an aqueous acetic acid solution (0.35 N, 20 mL) and the polymer was precipitated on pouring into n-hexane (300 mL) to give white solids. The product was purified by precipitation from $CH_2Cl_2$ (30 mL)/Hexane (150 mL) mixture solution. The final crystalline solid was precipitated from $CH_2Cl_2$ (30 mL)/MeOH (150 mL) and dried under vacuum at 50-60° C. overnight to yield 3.02 g of PS-b-PLA(CP-4) (yield: 48%). Mn=46700 and PDI=1.17. $^1$H NMR ($CDCl_3$): 6.46-7.09 (br, 5H, ArH), 5.16 (q, 1H, $CH(CH_3)$, J=7.2 Hz), 1.84 (br, 1H, CH), 1.58 (d, 3H, $CH(CH_3)$, J=7.2 Hz), 1.42 (br, 2H, $CH_2$). $^1$H and $^{13}$C NMR spectra were recorded on a Varian VXR-300 (300 MHz for $^1$H and 75 MHz for $^{13}$C) or a Varian Gemini-200 (200 MHz for $^1$H and 50 MHz for $^{13}$C) spectrometer with chemical shifts given in ppm from the internal TMS or the central line of $CHCl_3$. The GPC measurements were performed on a Hitachi L-7100 system equipped with a differential Bischoff 8120 RI detector using THF (HPLC grade) as an eluent. Molecular weight and molecular weight distributions were calculated using polystyrene as standard.

A number of poly(styrene)-poly(L-lactide) (PS-PLLA) chiral block copolymers were prepared. On the basis of molecular weight and volume ratio, these PS-PLLAs are designated as PSxx-PLLAyy ($f_{PLLA}^v$=z), wherein xx and yy represent the molecular weight of PS and PLLA divided by one thousand measured by NMR, respectively, and z indicates the volume fraction of PLLA. In these calculations, the densities of PS and PLLA are assumed to be 1.02 and 1.18 g/cm$^3$, respectively.

EXAMPLE 3

Synthesis of Block Copolymers of PS280PLLA127

Another series of PS-PLLA copolymers with different volume ratios were prepared by the same two-step "living" polymerization sequence. On the basis of molecular weight and volume ratio, these PS-PLLAs were designated as PSx-PLLAy ($f_{PLLA}^v$=z), with x and y representing the numbers of the repeating unit for PS and PLLA blocks and z representing the volume fraction of PLLA (calculated by assuming that densities of PS and PLLA were 1.02 and 1.18 g/cm$^3$, respectively). Bulk samples of the block copolymers were prepared by solution casting from dichloromethane ($CH_2Cl_2$) solution (10 wt % of PS-PLLA) at room temperature.

EXAMPLE 4

Transmission Electron Microscopy (TEM) and Small-Angle X-ray Scattering (SAXS) Studies Crystallization of PLLA in PS-PLLA gave rise to significant changes for microphase-separated morphology of PS-PLLA as observed in our laboratory. It is possible to destroy the formed microstructures so as to form crystalline morphology. DSC experiments were carried out in a Perkin Elmer DSC 7. For instance, PLLA blocks of PS29-PLLA22 ($f_{PLLA}^v$=0.37) melt at around 165° C. The maximum crystallization rate of PLLA blocks is at ca. 95° C. in accordance with exothermic response (i.e., the occurrence of crystallization) at different isothermal crystallizations. However, no significant exothermic response was observed under fast cooling. The glass transition temperatures of PLLA and PS are approximately 51.4° C. and 99.2° C., respectively.

SAXS experiments were conducted at the synchrotron X-raybeam-line X3A2 at the National Synchrotron Light Source in Brookhaven National Laboratory. The wavelength of the X-ray beam is 0.154 nm. The zero pixel of the SAXS patter was calibrated using silver behenate, with the first-order scattering vector q* (q*=4λ$^{-1}$ sin θ, where 2θ is the scattering angle) being 1.076 nm$^{-1}$. Time-resolved SAXS experiments were carried out in a heating chamber with step temperature increasing. Degradation temperature was identified by the disappearance of scattering peaks.

DSC thermogram appeared no melting endotherm during heating. WAXD (Widel-Angle X-ray Diffraction) diffraction exhibited amorphous diffraction profile. A Siemens D5000 1.2 kW tube X-ray generator (Cu K$_α$ radiation) with a diffractometer was used for WAXD powder experiments. The scanning 2θ angle ranged between 5° and 40° with a step scanning of 0.05° for 3 sec. The diffraction peak positions and widths observed from WAXD experiments were carefully calibrated with silicon crystals with known crystal size.

Transmission electron microscopy in bright field was performed with JEOL TEM-1200× transmission electron microscopy. Staining was accomplished by exposing the samples to the vapor of a 4% aqueous RuO$_4$ solution for 3 hours.

The surface of the solution-casting PS-PLLA samples after hydrolysis was observed using AFM (Atomic Force Microscopy). A Seiko SPA-400 AFM with a SEIKO SPI-3800N probe station was employed at room temperature in this work. A rectangle-shaped silicon tip was applied in dynamic force mode (DFM) experiments using a type of SI-DF20 with a spring force contact of 19 Nm$^{-1}$ and scan rate of 1.0 Hz.

Field emission scanning electron microscopy was used to observe the PS-PLLA samples from different views. Field emission scanning electron microscopy (FESEM) was performed on a Hitachi S-900 FE-SEM using accelerating voltages of 2-5 keV. Samples were examined either on the solution-cast surface or fractured cross sections of PS-PLLA thin films after hydrolysis. The samples were mounted to brass shims using carbon adhesive, and then sputter-coated with 2-3 nm of gold (the gold coating thickness is estimated from a calculated deposition rate and experimental deposition time).

EXAMPLES 5-8

Preparations of Varieties of PS-PLLA Having Hexagonal Cylindrical Nanostructures A variety of PS-PLLA bulk samples were prepared by solution casting from dichloromethane (CH$_2$Cl$_2$) solution (10 wt % of PS-PLLA) at room temperature. Table 1 shows the number-average molecular weights (Mn), polydiversity (PDI), volume fraction of polystyrene, $f_{PS}^v$, d-spacing, and diameter of the samples so prepared. The number-average molecular weight of each component of the copolymers was measured from integration of $^1$H NMR measurement. The polydipersity was obtained from GPC analysis. The values listed under column [c] were obtained from calculation of TEM micrographs. The values listed under column [d] determined from first scattering peak of SAXS. And the values listed under column [e] were obtained from surface analysis of scanning probe microscopy (SPM).

| PS-PLLA Copolymer | Mn,$_{PS}$ [g/mol] | Mn,$_{PLLA}$ [g/mol] | PDI | $f_{PS}^v$ | d-spacing [nm] | | | Diameter [nm] | | |
|---|---|---|---|---|---|---|---|---|---|---|
| | | | | | [c] | [d] | [e] | [c] | [d] | [e] |
| PS83-PLLA41 | 8900 | 5900 | 1.15 | 0.64 | 12.7 | 16.8 | 20.8 | 7.2 | 12.2 | 10.1 |
| PS198-PLLA71 | 20700 | 10200 | 1.17 | 0.70 | 25.8 | 28.4 | 32.9 | 13.8 | 18.9 | 19.7 |
| PS280-PLLA97 | 29400 | 14000 | 1.21 | 0.73 | 31.4 | 37.2 | 35.5 | 16.7 | 23.5 | 20.0 |
| PS365-PLLA109 | 38200 | 15700 | 1.21 | 0.74 | 34.1 | 39.7 | 44.2 | 17.0 | 24.6 | 20.9 |

Figure 1B:
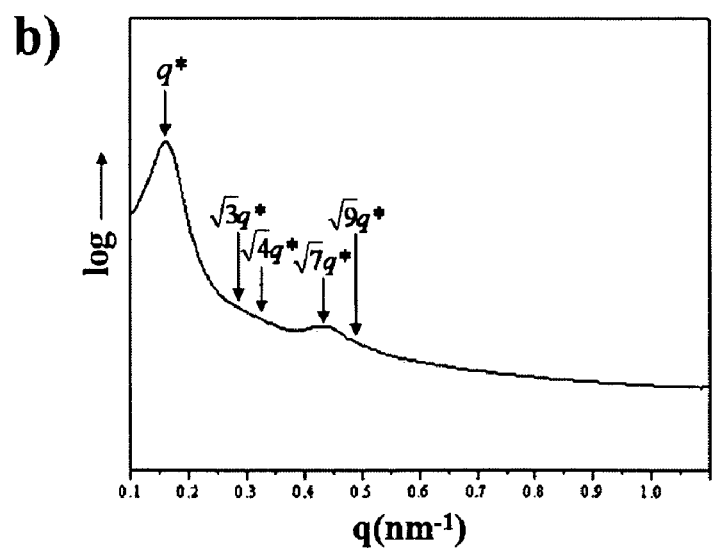

FIGS. 1A and 1B show that hexagonal cylinder nanostructures of amorphous PS-PLLA were identified by Transmission electron microscopy (TEM), and small-angle X-ray scattering (SAXS), respectively. Similar results for various PS-PLLA samples as provided in Table 1 having different molecular weights were also obtained. Thin films of the block copolymer were formed on different substrates by simply spin coating from dilute chlorobenzene (C$_6$H$_5$Cl) solution (1.5 wt % of PS-PLLA) at room temperature without further treatment.

FIG. 2A shows that well-oriented, perpendicular microdomains was obtained as evidenced by scanning probe microscopy (SPM). FIG. 2B shows that the effect of alignment was further confirmed by the TEM images where the projected images reflected perpendicular cylinders on the substrate. As evidenced by selected area electron diffraction experiments, no crystalline diffraction was identified; suggesting that amorphous or low crystallinity samples were obtained after spin coating. With the process of the present invention, the oriented microdomains can be as large as several cm$^2$ in area.

The method of the present invention can be tailored for great varieties of end use applications. For example, different substrates including glass slide, carbon-coated glass slide, indium tin oxide (ITO) glass, silicon wafer, silicon oxide, inorganic light emitted diode and alumina have been used for nanopatterning. Large-size, oriented perpendicular hexagonal cylinder morphology was obtained. However, the bottom morphology of the nanopatterns appeared well-defined nanostructures under SPM examination only if the film was treated by hydrolysis (i.e., degradation of PLLA); suggesting that there is always a thin layer of PLLA formed on the substrate after spin coating (for instance, ca. 5 nm as estimated by volume fraction for cast film on glass slide having 50 nm thickness). Similar to the recent studies of electric field alignment of block copolymers; the surface effect from coated substrate on morphology is always existent. The effects of substrate affinity and interfacial energy have been examined in this study. The surface tension of PLLA (~38.27 mN/m) is lower than that of PS (~40 mN/m) besides the affinity of PLLA with hydrophilic substrate is slightly higher than that of PS. As a result, PLLA favors to preferentially segregate on the substrate so as to form PLLA thin layer. The formation of PLLA thin layer can be avoided by spin-coating the samples at temperature above T$_{g,PLLA}$ but below T$_{g,PS}$. The behavior has also been observed in different cases; the glass transition temperature of at least one of the blocks should be below processing temperature in order to ease the substrate influence. As a result, the nanopatterned textures were thus schematically illustrated in FIG. 3A. Furthermore, the oriented nanostructures started losing orientation after long-time annealing at temperature above PLLA crystalline melting. As a result, we speculate that the ignorance of substrate effect is due to the kinetic effect under spinning to create a meta-stable morphology. Nevertheless, the oriented nanostructures can be fixed by simply oxidizing the PS matrix using $RuO_4$. After oxidation, the PS nanopatterns can be used at service temperatures above 250° C. Our preliminary results indicate that the oriented effect for block copolymer nanostructures is primarily attributed to the selection of appropriate solvent evaporation rate and its solubility between constituted blocks. Similar to solution casting approach, oriented perpendicular Hexagonal cylinder morphology was formed at intermediate evaporation rate for selective solvent.

FIG. 3A is an illustrative 3-D diagram showing the nanopatterns that are produced using the method of the present invention. The method of the present invention can be utilized to extend the applicability of nanopatterns. It is possible to have tunable film thickness and dimension for nanopatterning. Reasonably wide range of film thickness from 20 nm to 160 nm can be obtained by simply controlling the spin rate of coating as expected. Oriented PS-PLLA samples can be achieved regardless of thin-film thickness. Also, the surface topography of formed nanopatterns is very smooth; the averaged roughness is in the range of 0.4 nm by SPM roughness evaluation. Different domain sizes as determined by TEM, SAXS and SPM were obtained by controlling molecular weight of PS-PLLA. FIGS. 3B and 3C show that, following the successful procedure for hydrolysis of PLA, well-oriented, perpendicular hexagonal cylinder nanochannel arrays were simply obtained within hour by using a sodium hydroxide solution of methanol/water (0.5M solution was prepared by dissolving 2 g of sodium hydroxide in an 40/60 (by volume) solution of methanol/water) at 60° C. for the degradation of amorphous PLLA. Consequently, nanopatterned templates over large area in addition to uniform surface with controlled thickness and domain size in the form of thin films were successfully prepared on different substrates.

FIGS. 4A, 4B, and 4C show the TEM micrographs of solution-cast of (a) PS83-PLLA41 ($f_{PLLA}^v$=0.34); (b) PS198-PLLA71 ($f_{PLLA}^v$=0.27) and (c) PS280-PLLA97 ($f_{PLLA}^v$=0.31) bulk samples quenched from microphase-separated melt, respectively. The samples were microsectioned by microtome, and then stained by $RuO_4$ to obtain mass-thickness contrast. The corresponding azimuthally scanned one-dimensional SAXS profiles are also obtained as shown in FIGS. 4D, 4E, and 4F, respectively.

FIGS. 5A, 5B, 5C, and 5D show the tapping-mode SPM phase images of the surfaces of spin-coated PS365-PLLA109 ($f_{PLLA}^v$=0.26) thin films on (a) glass slide; (b) carbon-coated glass slide; (c) indium tin oxide (ITO) glass; (d) silicon wafer.

FIGS. 6A and 6B show the tapping-mode SPM height images of the bottom morphology for spin-coated PS365-PLLA109 ($f_{PLLA}^v$=0.26) thin film on glass slide (a) before hydrolysis; and (b) after hydrolysis, respectively.

FIGS. 7A, 7B, 7C, and 7D show the tapping-mode SPM phase images of the surfaces of spin coated PS365-PLLA109 ($f_{PLLA}^v$=0.26) thin films on glass slide by using different solvents for spin coating: (a) dichlorobenzene (vapor pressure at 20° C.: 0.52 mm Hg); (b) chlorobenzene (vapor pressure at 20° C.: 12 mm Hg); (c) toluene (vapor pressure at 20° C.: 22 mm Hg); (d) THF (vapor pressure at 20° C.: 131.5 mm Hg), respectively.

FIGS. 8A, 8B, and 8C show the tapping-mode SPM phase images of the surfaces of spin coated PS365-PLLA109 ($f_{PLLA}^v$=0.26) thin films on glass slide from chlorobenzene with different thin-film thickness: (a) 160 nm; (b) 80 nm; (c) 50 nm; (d) 30 nm, respectively.

FIG. 9A shows the plot of film thickness versus spin rate for spin-coated PS365-PLLA109 ($f_{PLLA}^v$=0.26) thin films on glass slides. Open circle indicates the sample thickness measured by SPM whereas open triangle indicates the thickness measured by depth profiler. FIG. 9B shows the 3D tapping-mode SPM height image of SPM for spin-coated PS365-PLLA109 ($f_{PLLA}^v$=0.26) thin film after hydrolysis.

Finally, FIGS. 10A and 10B show FESEM micrographs of hydrolyzed PS365-PLLA109 ($f_{PLLA}^v$=0.26) samples by viewing parallel to the cylindrical axes.

As discussed above, the present invention discloses an efficient and cost-effective way to prepare large-scale microdomains from PS-PLLA diblock copolymers. Owing to the hydrolysis character of the polyester components, the formation of the ordered nanohole arrays provides a simple path to prepare nanopatterned templates for nanoapplications.

What is claimed is:

1. A method for manufacturing nanoscale objects comprising the steps of:
   (a) obtaining a nanopatterned template and using said nanopatterned template to form nanoscale objects;
   (b) wherein said nanopatterned template is formed using the method comprising the steps of:
   (i) using a block copolymerization to prepare a block copolymer comprising first and second polymer blocks, said first and second polymer blocks being incompatible with each other;
   (ii) forming a thin film on a substrate by spin coating using a solvent having a vapor pressure of about 10 mm Hg at 20° C. such that said first polymer blocks form into a periodically ordered topology; and
   (iii) selectively degrading said first polymer blocks to cause said thin film to become a nanoporous material with a periodically ordered porous geomorphology.

2. The method for manufacturing nanoscale objects according to claim 1 wherein said first polymer blocks have a hexagonal cylindrical geomorphology with its axis perpendicular to a surface of said thin film.

3. The method for manufacturing nanoscale objects according to claim 1 wherein said first polymer is selected from the group consisting of poly(L-lactide), poly(D-lactide), poly(lactide), poly(acprolactone), and said second polymer is selected from the group consisting of poly(styrene), poly (vinylpyridine), and poly(acrylonitile).

4. The method for manufacturing nanoscale objects according to claim 1 wherein said block copolymer is poly (styrene)-poly(L-lactide)(PS-PLLA) chiral block copolymer, said first polymer is poly(L-lactide), and said second polymer is polystyrene.

5. The method for making a series of nanoscale objects according to claim 1, wherein said block polymer is poly(4-vinylpyridine)-poly(L-lactide)(P4VP-PLLA) chiral block copolymer, said first polymer is poly(L-lactide), and said second polymer is pol(4-vinylpyridine).

6. The method for making a series of nanoscale objects according to claim 1, wherein said block copolymer is poly (acrylonitrile)-poly(caprolactone)(PVHF-PCL) block copolymer, said first polymer is poly(caprolactone), and said second polymer is pol(acrylonitrile).

7. The method for making a series of nanoscale objects according to claim 1, wherein said periodically ordered topology of said first polymer blocks is formed by controlled solution casting, shield fields, electric fields, patterned substrates, temperature gradients, or epitaxial crystallization.

8. The method for making nanoscale objects according to claim 1 wherein first polymer blocks are selectively degraded by hydrolysis.

9. The method for making nanoscale objects according to claim 1 wherein the solvent is chlorobenzene.

* * * * *